United States Patent
Lee et al.

(10) Patent No.: US 10,122,406 B2
(45) Date of Patent: Nov. 6, 2018

(54) COEXISTENCE OVER A SHARED BAND WITH DUAL ANTENNA SHARING

(71) Applicant: QUALCOMM Incorporated, San Diego, CA (US)

(72) Inventors: Heechoon Lee, San Diego, CA (US); Won-Joon Choi, Seongnam-Si (KR); Ning He, Sammamish, WA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/195,721

(22) Filed: Jun. 28, 2016

(65) Prior Publication Data
US 2016/0380665 A1    Dec. 29, 2016

Related U.S. Application Data

(60) Provisional application No. 62/186,267, filed on Jun. 29, 2015.

(51) Int. Cl.
*H04B 1/18* (2006.01)
*H04B 1/401* (2015.01)
(Continued)

(52) U.S. Cl.
CPC .............. *H04B 1/401* (2013.01); *H04B 1/18* (2013.01); *H04W 36/14* (2013.01); *H04W 48/16* (2013.01);
(Continued)

(58) Field of Classification Search
CPC . H04W 88/06; H04W 48/16; H04W 72/1215; H04W 4/02; H04W 16/14;
(Continued)

(56) References Cited

U.S. PATENT DOCUMENTS 9,042,825 B2   5/2015   Banerjea et al.
9,385,795 B1 * 7/2016   Ananthanarayanan ..................... H04B 7/0469
(Continued)

FOREIGN PATENT DOCUMENTS

EP    2712239 A1    3/2014

OTHER PUBLICATIONS

ISA/EP, International Search Report and Written Opinion of the International Searching Authority, Int'l Application No. PCT/US2016/040059, dated Jan. 25, 2017, European Patent Office, Rijswijk, NL, 21 pgs.
(Continued)

*Primary Examiner* — Thanh Le
(74) *Attorney, Agent, or Firm* — Holland & Hart LLP

(57) ABSTRACT

This disclosure provides techniques for managing antenna sharing on a multi-mode wireless device between coexisting cellular and WLAN modems operating on the same band. One of the modems can communicate a WLAN scanning parameter to another one of the modems, and the distribution of shared antennas between the cellular modem and the WLAN modem may be modified based at least in part on the communicated scanning parameter to accommodate a WLAN scan on channels in the shared band. The distribution of the shared antennas between the modems for the WLAN scan may additionally or alternatively be selected based at least in part on the source of a detected WLAN scanning trigger (e.g., whether the scan is triggered by an application of the wireless device or the WLAN modem of the wireless device).

12 Claims, 12 Drawing Sheets

(51) Int. Cl.
*H04W 36/14* (2009.01)
*H04W 48/16* (2009.01)
*H04W 88/06* (2009.01)
*H04W 76/10* (2018.01)
*H04W 84/12* (2009.01)
*H04W 72/12* (2009.01)

(52) U.S. Cl.
CPC ........... *H04W 76/10* (2018.02); *H04W 88/06* (2013.01); *H04W 72/1215* (2013.01); *H04W 84/12* (2013.01)

(58) Field of Classification Search
CPC ..... H04W 36/14; H04W 48/08; H04W 48/12; H04W 48/18; H04W 64/00; H04W 76/02; H04B 1/108; H04B 1/401; H04B 7/0469; H04B 7/0689; H04B 7/0825; H04B 15/00
See application file for complete search history.

(56) References Cited

U.S. PATENT DOCUMENTS

| | | |
|---|---|---|
| 9,602,313 B1 * | 3/2017 | Jalloul .................. H04B 15/00 |
| 2012/0329395 A1 | 12/2012 | Husted et al. |
| 2013/0196673 A1 | 8/2013 | Smadi et al. |
| 2014/0003261 A1 | 1/2014 | Gillett et al. |
| 2014/0301493 A1 | 10/2014 | Govindswamy et al. |
| 2014/0349584 A1 | 11/2014 | Clevorn et al. |
| 2015/0036656 A1 | 2/2015 | McCarthy et al. |
| 2016/0037544 A1 | 2/2016 | Wang |
| 2016/0127972 A1 | 5/2016 | Ananthanarayanan et al. |

OTHER PUBLICATIONS

ISA/EPO, Partial International Search Report of the International Searching Authority, Int'l. App. No. PCT/US2016/040059, dated Sep. 29, 2016, European Patent Office, Rijswijk, NL, 7 pgs.

* cited by examiner

COEXISTENCE OVER A SHARED BAND WITH DUAL ANTENNA SHARING

CROSS REFERENCES

The present application for patent claims priority to U.S. Provisional Patent Application No. 62/186,267 by Lee et al., entitled "Coexistence Over a Shared Channel with Dual Antenna Sharing," filed Jun. 29, 2015, assigned to the assignee hereof.

BACKGROUND

Field of the Disclosure

The present disclosure, for example, relates to wireless communication systems, and more particularly to techniques for managing antenna sharing between coexisting RATs in a multimode wireless device.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

Some wireless devices are capable of communicating using multiple radio access technologies (RATs). For example, a wireless device may have coexisting cellular and wireless local area network (WLAN) modems. Certain types of cellular networks and WLANs are capable of operating over the same shared radio frequency spectrum band, such as an unlicensed band. When a wireless device supports both cellular and WLAN operations on the same band, operations on the cellular network can potentially disrupt operations on the WLAN network, and vice versa.

SUMMARY

This disclosure provides techniques for managing antenna sharing on a multi-mode wireless device between coexisting RATs operating on the same band. The multi-mode wireless device may have multiple antennas, at least some of which may be shared between a cellular modem and a WLAN modem. When WLAN functionality is turned off or disconnected and a cellular connection is configured, the cellular modem may be coupled to all of the shared antennas. If the WLAN modem or an application running on the device triggers a WLAN scan on channels in the shared band while the cellular modem is connected to the shared antennas, a tune-away procedure may take place in which one or more of the shared antennas is disconnected from the cellular modem and coupled to the WLAN modem to accommodate the WLAN scan.

One of the modems of the wireless device can communicate a WLAN scanning parameter to another one of the modems, and the distribution of shared antennas between the cellular modem and the WLAN modem may be modified based at least in part on the communicated scanning parameter to accommodate a WLAN scan on channels in the shared band. The distribution of the shared antennas between the modems for the WLAN scan may additionally or alternatively be selected based at least in part on the source of a detected WLAN scanning trigger (e.g., whether the scan is triggered by an application of the wireless device or the WLAN modem of the wireless device).

A method of wireless communication is described. The method may include receiving a WLAN scanning parameter at a first modem of the wireless device from a second modem of the wireless device, wherein the first modem is associated with a first RAT and the second modem is associated with a second RAT, modifying a distribution of the plurality of antennas between the first modem and the second modem based at least in part on the WLAN scanning parameter, and performing a WLAN scan on channels in a band that is shared by the first modem and the second modem based at least in part on the distribution of the plurality of antennas.

An apparatus for wireless communication is described. The apparatus may include means for receiving a WLAN scanning parameter at a first modem of the wireless device from a second modem of the wireless device, wherein the first modem is associated with a first RAT and the second modem is associated with a second RAT, means for modifying a distribution of the plurality of antennas between the first modem and the second modem based at least in part on the WLAN scanning parameter, and means for performing a WLAN scan on channels in a band that is shared by the first modem and the second modem based at least in part on the distribution of the plurality of antennas.

A further apparatus for wireless communication is described. The apparatus may include a processor, memory in electronic communication with the processor, and instructions stored in the memory and operable, when executed by the processor, to cause the apparatus to receive a WLAN scanning parameter at a first modem of the wireless device from a second modem of the wireless device, wherein the first modem is associated with a first RAT and the second modem is associated with a second RAT, modify a distribution of the plurality of antennas between the first modem and the second modem based at least in part on the WLAN scanning parameter, and perform a WLAN scan on channels in a band that is shared by the first modem and the second modem based at least in part on the distribution of the plurality of antennas.

A non-transitory computer-readable medium storing code for wireless communication is described. The code may include instructions executable to receive a WLAN scanning parameter at a first modem of the wireless device from a second modem of the wireless device, wherein the first modem is associated with a first RAT and the second modem is associated with a second RAT, modify a distribution of the plurality of antennas between the first modem and the second modem based at least in part on the WLAN scanning parameter, and perform a WLAN scan on channels in a band that is shared by the first modem and the second modem based at least in part on the distribution of the plurality of antennas.

In some examples of the method, apparatuses, or non-transitory computer-readable medium described herein, modifying the distribution of the plurality of antennas between the first modem and the second modem comprises performing a diversity antenna tune-away for the WLAN scan. Additionally or alternatively, in some examples the first modem comprises a WLAN modem and the second modem comprises a cellular modem, and wherein the WLAN scan is performed by the WLAN modem on channels in a shared band.

Some examples of the method, apparatuses, or non-transitory computer-readable medium described herein may further include processes, features, means, or instructions for determining a state of the WLAN modem at the cellular modem, and transmitting, by the cellular modem, the WLAN scanning parameter to the WLAN modem based at least in part on the state of the WLAN modem. Additionally or alternatively, in some examples the WLAN scanning parameter comprises an indication of a start time and a duration of the WLAN scan.

In some examples of the method, apparatuses, or non-transitory computer-readable medium described herein, the WLAN scanning parameter comprises a duty cycle associated with the WLAN scan and the modified distribution of the plurality of antennas. Additionally or alternatively, some examples may include processes, features, means, or instructions for determining the duty cycle at the cellular modem based at least in part on a previous WLAN scan by the WLAN modem.

In some examples of the method, apparatuses, or non-transitory computer-readable medium described herein, the duty cycle indicates a first period and a second period, and modifying the distribution of the plurality of antennas between the first modem and the second modem comprises coupling a subset of the plurality of antennas to the WLAN modem during the first period and to the cellular modem during the second period. Additionally or alternatively, some examples may include processes, features, means, or instructions for performing the WLAN scan is based at least in part on a determination by the WLAN modem that a duration of the WLAN scan is shorter than the first period.

In some examples of the method, apparatuses, or non-transitory computer-readable medium described herein, modifying the distribution of the plurality of antennas comprises decoupling the subset of the plurality of antennas from the cellular modem during the first period, and modifying the distribution of the plurality of antennas comprises decoupling the subset of the plurality of antennas from the WLAN modem during the second period. Additionally or alternatively, in some examples the first modem comprises a cellular modem and the second modem comprises a WLAN modem, and the WLAN scan is performed by the WLAN modem on channels in a shared band.

In some examples of the method, apparatuses, or non-transitory computer-readable medium described herein, the WLAN scanning parameter comprises an indication of a start time and a duration of the WLAN scan. Additionally or alternatively, in some examples modifying the distribution of the plurality of antennas comprises coupling a subset of the plurality of antennas to the WLAN modem for the indicated duration of the WLAN scan.

Some examples of the method, apparatuses, or non-transitory computer-readable medium described herein may further include processes, features, means, or instructions for decoupling the subset of the plurality of antennas from the cellular modem for the indicated duration of the WLAN scan.

A method of wireless communication is described. The method may include detecting a WLAN scanning trigger, selecting a distribution of the plurality of antennas between a cellular modem of the wireless device and a WLAN modem of the wireless device based at least in part on whether the detected WLAN scanning trigger originates from an application of the wireless device or from the WLAN modem of the wireless device, and performing a WLAN scan on channels within a shared band using the WLAN modem of the wireless device.

An apparatus for wireless communication is described. The apparatus may include means for detecting a WLAN scanning trigger, means for selecting a distribution of the plurality of antennas between a cellular modem of the wireless device and a WLAN modem of the wireless device based at least in part on whether the detected WLAN scanning trigger originates from an application of the wireless device or from the WLAN modem of the wireless device, and means for performing a WLAN scan on channels within a shared band using the WLAN modem of the wireless device.

A further apparatus for wireless communication is described. The apparatus may include a processor, memory in electronic communication with the processor, and instructions stored in the memory and operable, when executed by the processor, to cause the apparatus to detect a WLAN scanning trigger, select a distribution of the plurality of antennas between a cellular modem of the wireless device and a WLAN modem of the wireless device based at least in part on whether the detected WLAN scanning trigger originates from an application of the wireless device or from the WLAN modem of the wireless device, and perform a WLAN scan on channels within a shared band using the WLAN modem of the wireless device.

A non-transitory computer-readable medium storing code for wireless communication is described. The code may include instructions executable to detect a WLAN scanning trigger, select a distribution of the plurality of antennas between a cellular modem of the wireless device and a WLAN modem of the wireless device based at least in part on whether the detected WLAN scanning trigger originates from an application of the wireless device or from the WLAN modem of the wireless device, and perform a WLAN scan on channels within a shared band using the WLAN modem of the wireless device.

Some examples of the method, apparatuses, or non-transitory computer-readable medium described herein may further include processes, features, means, or instructions for selecting a band for the WLAN scan based at least in part on whether the detected WLAN scanning trigger originates from the application of the wireless device or from the WLAN modem of the wireless device. Additionally or alternatively, in some examples selecting the distribution of the plurality of antennas comprises decoupling a subset of the plurality of antennas from the cellular modem and coupling the subset of the plurality of antennas to the WLAN modem if the WLAN scanning trigger originates from the WLAN modem.

In some examples of the method, apparatuses, or non-transitory computer-readable medium described herein, the WLAN scan is performed using the subset of the plurality of antennas. Additionally or alternatively, some examples may include processes, features, means, or instructions for receiving a WLAN scanning parameter at the WLAN modem from the cellular modem, and the WLAN scan is performed using the WLAN scanning parameter from the cellular modem based at least in part on the WLAN scanning trigger originating from the WLAN modem.

In some examples of the method, apparatuses, or non-transitory computer-readable medium described herein, selecting the distribution of the plurality of antennas comprises maintaining a current antenna configuration if the scanning trigger originates from the application of the wireless device.

Some examples of the methods, apparatuses, or non-transitory computer-readable media described herein may further include processes, features, means, or instructions for managing antenna sharing between coexisting RATs in a multimode device. Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

This disclosure provides techniques for managing antenna sharing on a multi-mode wireless device between coexisting RATs operating on the same band or channels in the band. The multi-mode wireless device may have multiple shared antennas, at least some of which are distributed between a cellular modem and a WLAN modem. When WLAN functionality is turned off or disconnected and a cellular connection is configured, the cellular modem may be coupled to all of the shared antennas to enable spatial diversity in cellular communications. If the WLAN modem or an application running on the device triggers a WLAN scan over the shared band while the cellular modem is connected to the shared antennas, a tune-away procedure may occur in which one or more of the shared antennas is disconnected from the cellular modem and coupled to the WLAN modem to accommodate the WLAN scan.

According to one technique described in this disclosure, one of the modems of a multi-mode wireless device may receive a WLAN scanning parameter (e.g., a scanning duty cycle, a scanning start time, a scanning duration, etc.) from another modem of the wireless device. Specifically, a cellular modem may provide a WLAN scanning parameter to a WLAN modem, or alternatively, the WLAN modem may provide a WLAN scanning parameter to the cellular modem. Based at least in part on the WLAN scanning parameter communicated between the modems, a distribution of antennas between the first modem and the second modem is modified to accommodate the WLAN scan. The WLAN scan is then performed over the band shared by the first modem and the second modem based at least in part on the distribution of the antennas between the modems.

In another example, a WLAN scanning trigger is detected in a multi-mode wireless device having multiple shared antennas, a cellular modem, and a WLAN modem. A distribution of the plurality of antennas between the modems is selected based at least in part on whether the WLAN scanning trigger originates from an application of the wireless device or from the WLAN modem of the wireless device. The WLAN scan is then performed using the WLAN modem of the wireless device according to the selected distribution of the antennas between the modems. These and other aspects of the disclosure are further illustrated by and described with reference to apparatus diagrams, system diagrams, and flowcharts.

Figure 1:
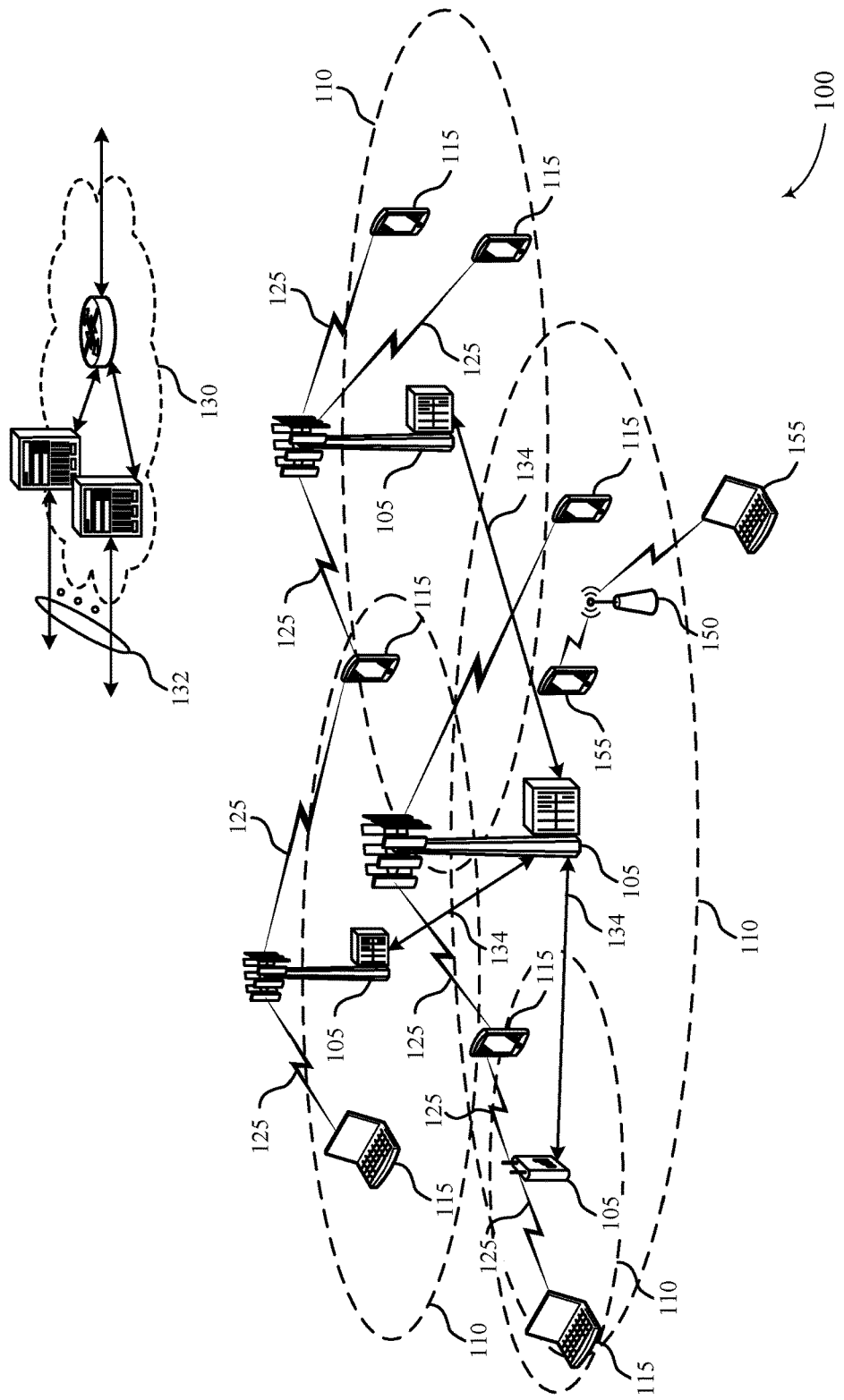
FIG. 1 illustrates an example of a wireless communications system that supports managing antenna sharing between coexisting RATs in a multimode device in accordance with various aspects of the present disclosure.

FIG. 1 illustrates an example of a wireless communications system 100 that supports managing antenna sharing between coexisting RATs in a multimode device in accordance with various aspects of the present disclosure. The wireless communications system 100 includes base stations 105, UEs 115, APs 150, STAs 155, and a core network 130. In some examples, the wireless communications system 100 may be a Long Term Evolution (LTE)/LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. The base stations 105 may support and utilize sounding reference signals for communications over a shared spectrum. For example, the base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) in some examples.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like. The UEs 115 may also utilize sounding reference signals to communicate with base stations 105 over shared spectrum.

A UE 115 may be configured with multiple carriers in carrier aggregation (CA) configuration, and the communication links 125 may represent such multicarrier CA configurations. A carrier may also be referred to as a component carrier (CC), a layer, a channel, etc. The term "component carrier" may refer to each of the multiple carriers utilized by a UE 115 in CA operation, and may be distinct from other portions of system bandwidth. For instance, a CC may be a relatively narrow-bandwidth carrier susceptible of being utilized independently or in combination with other component carriers. Each CC may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual CC may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. In some cases, a UE 115 may utilize an enhanced CC (eCC) for wideband transmissions. An eCC may similarly be aggregated with other eCCs or with CCs as described above.

A UE 115 may communicate with a single base station 105 utilizing multiple carriers, and may also communicate with multiple base stations 105 simultaneously on different carriers. Each cell of a base station 105 may include an UL CC and a DL CC. The geographic coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., ACK/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

In some examples, the wireless communications system 100 may operate according to a first radio access technology (e.g., a cellular radio access technology, such as an LTE/LTE-A technology), but operate in the presence of one or more networks or nodes operating according to a second radio access technology (e.g., a Wi-Fi technology). By way of example, FIG. 1 shows a network comprised of a Wi-Fi access point (AP) 150 in communication with Wi-Fi stations (STAs) 155. In some examples, a UE 115 or base station 105 may support operation in unlicensed bands used by Wi-Fi. A STA 155 or AP 150 may be Wi-Fi devices that may support LTE but may not be configured for LTE operation in an unlicensed band. In the interest of clarity, devices that support LTE operation in a shared band will be referred to as base stations 105 or UEs 115 and devices that do not will be referred to as APs 150 or STAs 155.

In an LTE network, a base station 105 and a UE 115 may communicate over a dedicated frequency spectrum or over different frequency bands of the radio frequency spectrum (e.g., a dedicated radio frequency band and a shared radio frequency band) of a cellular network. With increasing data traffic in cellular networks that use a dedicated (e.g., licensed) radio frequency bands, offloading of at least some data traffic to a shared radio frequency spectrum may provide a cellular operator with opportunities for enhanced data transmission capacity. A shared radio frequency spectrum may also provide service in areas where access to a dedicated radio frequency spectrum is unavailable. A Wi-Fi network may utilize certain frequency bands, such as the 2.4 or 5 GHz bands, within a shared spectrum (e.g., the unlicensed spectrum). The LTE network may similarly utilize these frequency bands, and in some cases, utilizes the 5 GHz band, but not the 2.4 GHz band for communications.

A multi-mode wireless device (e.g., a UE 115) that is capable of communicating over these unlicensed bands may operate using either the LTE or WLAN network. The wireless device may include an LTE modem that is used to perform LTE communications and a WLAN modem that is used for WLAN communications. In some cases, the wireless device is equipped with one or more antennas that are designed for communications over one or more unlicensed band(s) (e.g., 2.4 and 5 GHz). In cases where the LTE network utilizes the unlicensed band, the antennas may be shared by the LTE and WLAN modems. Accordingly, WLAN and LTE communications from and to the LTE device may interfere with one another.

Therefore, the LTE device may partition the use of the shared antennas between the WLAN modem and the LTE modem to enable either WLAN and LTE operations. In one example, the WLAN modem and the LTE modem may communicate with one another to determine which modem has access to which antennas. Either modem may send a scanning parameter to the other indicating a period where one modem has access to one or more of the shared antennas. For periods when the WLAN modem has access to a shared antenna, the WLAN modem may perform a WLAN scan over the shared band. For instance, an LTE modem may send a scanning parameter that indicates a duty cycle to the WLAN modem, where the WLAN modem has access to one or more antennas during an on period and the LTE modem has access to the antennas during the off period. Alternatively, the WLAN modem may send a scanning parameter indicating that the WLAN modem is taking control of one or more antennas and a duration indicating the length of time the WLAN modem will retain control.

Figure 2:
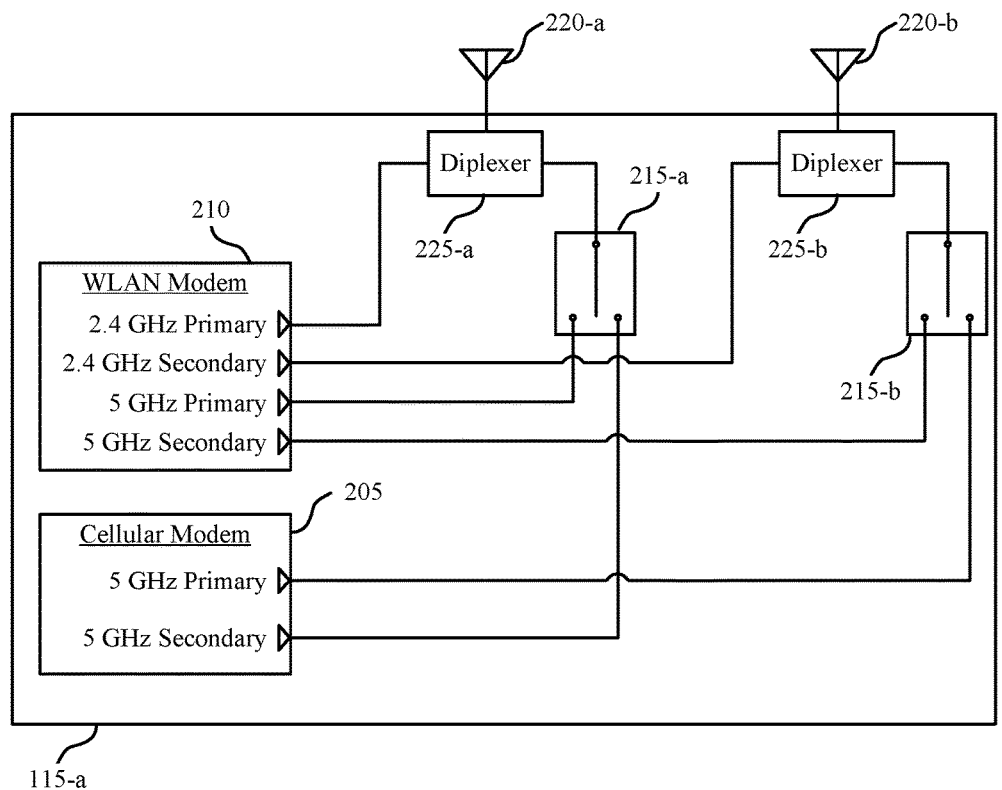
FIG. 2 illustrates an example of a wireless device for managing antenna sharing between coexisting RATs in a multimode device in accordance with various aspects of the present disclosure.

FIG. 2 illustrates an example of a wireless device 115-a for managing antenna sharing between coexisting RATs in a multimode device in accordance with various aspects of the present disclosure. Wireless device 115-a may be an example of a UE 115 as described above with reference to FIG. 1. Wireless device 115-a includes cellular modem 205, WLAN modem 210, switches 215, antennas 220, and diplexers 225.

WLAN modem 210 may include a 2.4 GHz primary antenna port that is associated with communications over antenna 220-*a* and a secondary 2.4 GHz antenna port that is associated antenna 220-*b*. WLAN modem 210 may also include primary and secondary antenna ports that are similarly associated with antennas 220-*a* and 220-*b*. In some cases, the primary antenna ports are used for transmissions while the secondary antenna ports are used for reception of signals. Cellular modem 205 may include primary and secondary 5 GHz antenna ports that are associated with the antennas 220-*a* and 220-*b*. In some cases, cellular modem 205 may be able to fully communicate with a base station 105 with either the primary antenna or the secondary antenna. Cellular modem 205 may include additional antennas for communication over one or more dedicated LTE bands (e.g., 1800 MHz) which are not shown. In some cases, the primary antenna ports for the WLAN modem 210 and cellular modem 205 are associated with different antennas (e.g., the cellular modem's primary port is associated with antenna 220-*b* while the WLAN modem's primary port is associated with antenna 220-*a*) in what may be called a cross connection configuration. In other cases, the primary antenna ports for both the WLAN modem 210 and the cellular modem 205 are connected to the same antenna in what is referred to as a shared primary connection.

In some cases, both the cellular modem 205 and the WLAN modem 210 may attempt to simultaneously perform communications over the 5 GHz band. Because antennas 220-*a* and 220-*b* are shared by the modems, however, significant interference may result without provided protection mechanisms, such as switches 215-*a* and 215-*b*. Note that simultaneous communications associated with the 2.4 GHz and 5 GHz bands utilize diplexers 225-*a* and 225-*b* to prevent interference, where diplexers 225-*a* and 225-*b* may multiplex and demultiplex signals in the frequency domain using band pass filters corresponding to the input frequencies. Switches 215-*a* and 215-*b* may be used to separate 5 GHz transmissions from cellular modem 205 and WLAN modem 210. Switches 215-*a* and 215-*b* may be operated independently and provide multiple configurations between the antennas 220 and the modems. In some cases, either the WLAN modem 210 or the cellular modem 205 controls the switching procedures between the two modems (i.e., WLAN directed or cellular directed, respectively), as will be described in more detail below.

The cellular modem 205 and the WLAN modem 210 may be configured according to multiple possibilities. For instance, the LTE modem may be configured or not configured and the WLAN modem may be "off", "on/not connected", or "on/connected." Any combination of these states may be observed by wireless device 115-*a*.

Figure 3:
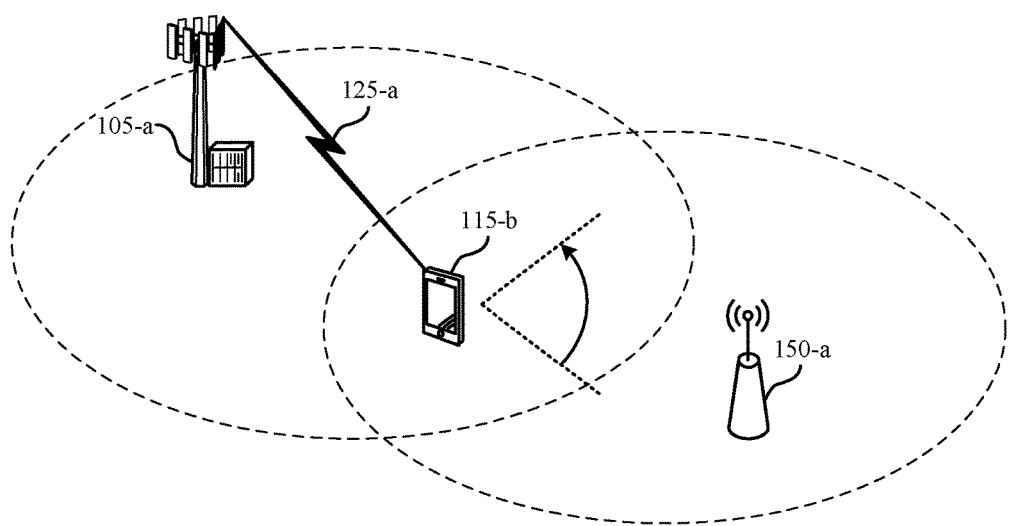
FIG. 3 illustrates an example of a wireless communications subsystem for managing antenna sharing between coexisting RATs in a multimode device in accordance with various aspects of the present disclosure.

FIG. 3 illustrates an example of a wireless communications subsystem 300 for managing antenna sharing between coexisting RATs in a multimode device in accordance with various aspects of the present disclosure. Wireless communications subsystem 300 may include UE 115-*b*, base station 105-*a*, and AP 150-*a*, which may be examples of a UE 115, base station 105, or AP 150 and may communicate as described above with reference to FIG. 1. UE 115-*b* may be capable of communications over both dedicated and shared spectrum. UE 115-*b* may utilize an LTE modem for communications with base station 105-*a* and a Wi-Fi modem for communications with AP 150-*a* over a shared spectrum (e.g., the 5 GHz band).

In one example, UE 115-*b* engages in communications over the shared spectrum with base station 105-*a*, while the Wi-Fi modem is in an off state and not connected. The Wi-Fi modem may subsequently enter an "on" state (e.g., Wi-Fi is enabled at the device) and send a message alerting the LTE modem that Wi-Fi has been enabled. Once the Wi-Fi modem enters the on state, the Wi-Fi modem may attempt to scan the shared band for available APs. However, the antennas used for unlicensed communication may be occupied by the LTE modem. In some cases, the LTE modem may determine a schedule for sharing the antennas after receiving the message that the Wi-Fi modem is engaged. The LTE modem may generate a scanning parameter that includes the determined scheduling and send the parameter to the Wi-Fi modem. For instance, the LTE modem may determine a duty cycle for Wi-Fi scanning that gives the Wi-Fi modem access to one or more unlicensed antennas for a first period of time and regains control of the unlicensed antennas for a second period of time. The WLAN may receive a message including a duty cycle, and during the first period, the WLAN modem may gain access to and perform scanning operations over one or more of the antennas.

The LTE modem may repeat the cycle at a determined periodicity and the WLAN modem may continue to scan for available APs. In some cases, the LTE modem may update the scanning parameters based on previous scanning activity. The WLAN modem may identify and attempt to connect to AP 150-*a* during a scanning period. After a successful connection, the WLAN modem may take control of the unlicensed antennas and the LTE modem may deconfigure an LTE connection with the base station 105-*a*, for example, by sending a message to the base station 105-*a* indicating that a radio link failure (RLF) has occurred. Additionally, the WLAN modem may attempt to connect to AP 150-*a* and the attempt may fail. After the failed attempt, the WLAN modem continue to scan for available APs.

In other cases, the Wi-Fi modem may determine the schedule for sharing the unlicensed antennas. For instance, UE 115-*b* may enable the Wi-Fi modem for communications. The Wi-Fi modem may send the LTE modem scanning parameters that include a scanning start indicator and a scanning duration indicator. After receiving the scanning parameters, the LTE modem may concede control of the shared antennas for the scanning duration indicated. If after the scanning period, the WLAN modem does not discover an available AP or if a connection attempt is unsuccessful, the LTE modem regains control of the shared antennas until a second set of scanning parameters is received. In this example, the WLAN modem may identify and connect to AP 150-*a*, and the LTE modem may declare a RLF with base station 105-*a*.

In either of the above cases, the Wi-Fi modem may engage in simultaneous communications over the 2.4 GHz and the 5 GHz bands using diplexers. For instance, an application may perform a Wi-Fi scan over the 2.4 GHz band to determine location information. This scan may be performed whether the Wi-Fi modem is in the "on" or "off" state and may occur without modification of the antenna configuration. In some examples, the shared band may be further divided into smaller bands. For example, the 5 GHz band of unlicensed spectrum may include multiple subbands. In these cases, the scanning may take place over a subset of the subbands or over the entire 5 GHz band as appropriate.

Figure 4:
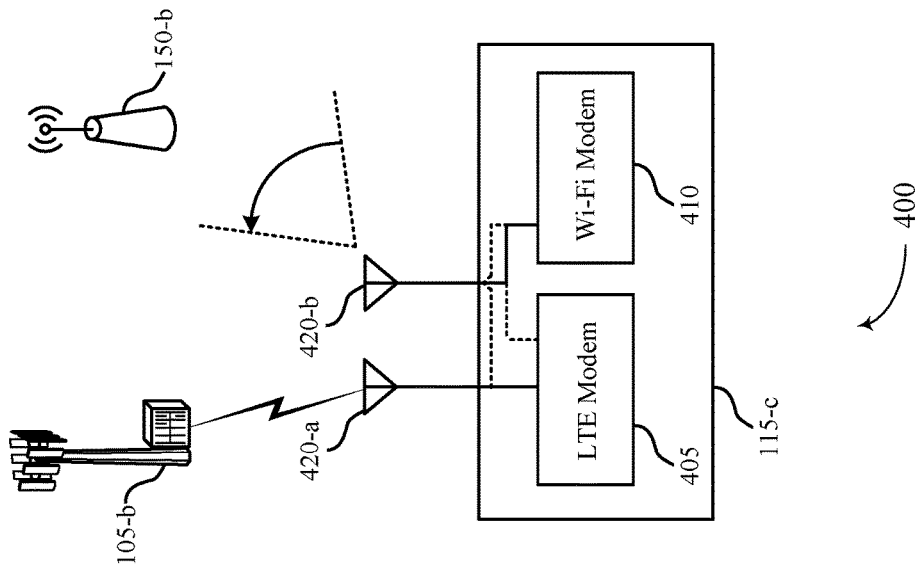
FIG. 4 illustrates an example of an wireless communications subsystem for managing antenna sharing between coexisting RATs in a multimode device in accordance with various aspects of the present disclosure.
Figure 4:
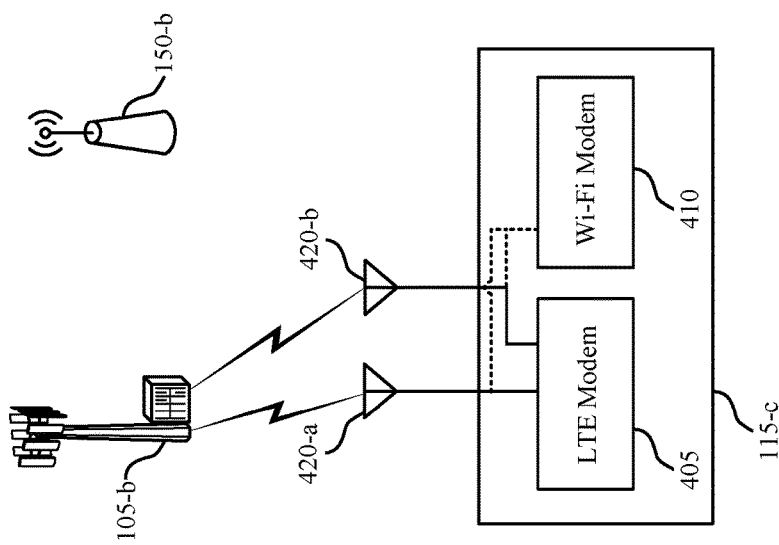

FIG. 4 illustrates an example of an wireless communications subsystem 400 for managing antenna sharing between coexisting RATs in a multimode device in accordance with various aspects of the present disclosure. Wireless communications subsystem 400 may illustrate aspects of antenna sharing and communications between base station 105-*b*, AP 150-*b*, and UE 115-*c*, as described above with reference to FIGS. 1-3. UE 115-*c* may include an LTE modem 405, which may be an example of a cellular modem 205, a Wi-Fi modem 410 which may be an example of a WLAN modem 210, and antennas 420 as described with reference to FIG. 2.

In one example, UE 115-c is configured for LTE operation over an unlicensed band and Wi-Fi modem 410 may be in an "off" state or an "on/not connected" state. LTE modem 405 and the Wi-Fi modem 410 may be connected to the antennas 420 through a switching mechanism that enables either modem to access the antennas 420. The switching mechanism may be configured so that LTE modem 405 is connected to both antennas 420 and UE 115-c may communicate with base station 105-b using antennas 420-a and 420-b. In cases where Wi-Fi modem 410 is in an "off" state, Wi-Fi modem 410 may continue to perform Wi-Fi scans to collect location data (e.g., application initiated scanning). UE 115-c may limit Wi-Fi modem 410 to the 2.4 GHz band for location scanning and the antennas 420 may remain as presently configured.

In cases where Wi-Fi modem 410 transitions from the "off" state to the "on/not connected" state, Wi-Fi modem 410 may transmit a scanning trigger to LTE modem 405. This may alert LTE modem 405 that antennas 420-a and 420-b will be shared for future communications. In one example, LTE modem 405 receives the scanning trigger and generates a set of scanning parameters that dictate future sharing of antennas 420-a and 420-b. LTE modem 405 then communicates the scanning parameters to Wi-Fi modem 410. The scanning parameters may include scheduling information for the antennas such as a "Wi-Fi scanning period" and an "LTE communication period." At the beginning of the "scanning period" 430, the antenna configuration may be modified so that Wi-Fi modem 410 has access to one or more of antennas 420-a and 420-b. In some cases, Wi-Fi modem 410 gains access to antenna 420-b and LTE modem retains access to antenna 420-a, in what may be referred to as "diversity tune away". In this way, LTE modem 405 may retain a connection with and continue to communicate with base station 105-b, while Wi-Fi modem 410 may scan the shared spectrum in search of an available AP. In other cases, Wi-Fi modem 410 may gain access to both antennas 420 and LTE modem 405 may declare a RLF to the base station 105-b until the scanning is complete, in what may be called "full tune away". If Wi-Fi modem 410 does not identify an available AP or if a connection attempt is unsuccessful, UE 115-c may return to the original configuration and full communications with base station 105-b may be resumed. UE 115-c may continue to switch between the first and second antenna configurations at a periodicity that is determined by LTE modem 405 until Wi-Fi modem 410 identifies an available AP such as AP 150-b.

Alternatively, Wi-Fi modem 410 may dictate the antenna configuration for UE 115-c. For instance, Wi-Fi modem 410 may transmit a scanning trigger, including scanning parameters to LTE modem 405, informing LTE modem that the Wi-Fi modem is taking control of one or more of antennas 420-a and 420-b. The scanning parameters may indicate to LTE modem 405 the beginning of the WLAN scanning period in addition to the length of time associated with the WLAN scanning period. Accordingly, at the beginning of the scanning period 430, LTE modem 405 may relinquish control of one or more antennas 420 to Wi-Fi modem 410. Wi-Fi modem 410 may then begin scanning operations over the shared band in search of an available AP. Scanning operation may include searching for candidate APs, performing location scanning, etc.

In either case, if Wi-Fi modem 410 identifies and connects with AP 150-b, then Wi-Fi modem 410 takes control of both antennas and LTE modem declares a RLF to base station 105-b.

Figure 5A:
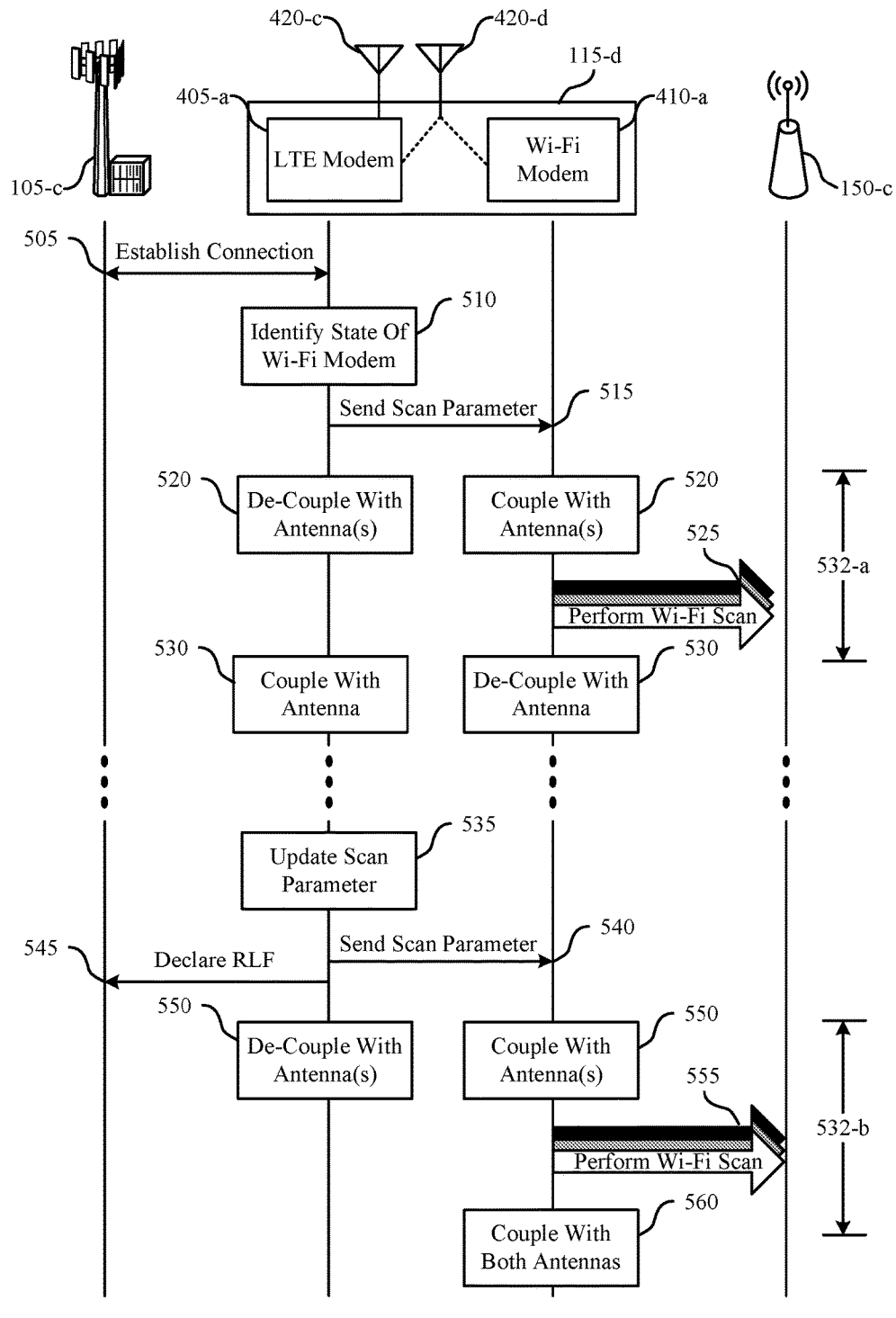
FIGS. 5A and 5B illustrate an example of process flows for managing antenna sharing between coexisting RATs in a multimode device in accordance with various aspects of the present disclosure.

FIG. 5A illustrates an example of a process flow 500-a for managing antenna sharing between coexisting RATs in a multimode device in accordance with various aspects of the present disclosure. Process flow 500-a may be performed by UE 115-d, base station 105-c, and AP 150-c which may be examples of a UE 115, a base station 105, and an AP 150 as described above with reference to FIGS. 1-2. LTE modem 405-a and Wi-Fi modem 410-a modify the configuration of antennas 420-c and 420-d at UE 115-d. In some examples, LTE modem 405-a dictates the schedule for sharing of the antennas 420 with Wi-Fi modem 410-a, in what may be referred to as LTE directed antenna sharing.

At step 505, UE 115-d may establish a connection with base station 105-c. Establishing a connection may include receiving a PRACH message from UE 115-d and establishing an RRC connection. The PRACH message may include capability information for UE 115-d, such as the capability to perform communications over both dedicated and shared spectrum. RRC messages may be sent between UE 115-d and base station 105-c to configure UE 115-d for communications over the shared spectrum. In some examples, base station 105-c may transmit an RRC message informing UE 115-d to utilize the shared spectrum.

At step 510, LTE modem 405-a identifies the operating state associated with Wi-Fi modem 410-a. Wi-Fi modem 410-a may operate in the "off", "on/not connected", and "on/connected" states. If Wi-Fi modem 410-a is operating in the "off" state, then LTE modem 405-a may refrain from sending scanning parameters to Wi-Fi modem 410-a for "tune away" procedures. In some cases, Wi-Fi modem 410-a may scan the shared band in the "off state," however, UE 115-d may limit Wi-Fi modem 410-a to the 2.4 GHz frequency band (e.g., for app-initiated location directed scanning). Since, antennas 420-c and 420-d may be simultaneously used for transmissions over either the 2.4 and 5 GHz frequency bands, LTE modem 405-a may refrain from re-configuring the antennas. If Wi-Fi modem 410-a is operating in the "on/not connected" state, LTE modem 405-a may generate a set of scanning parameters that determine a schedule for sharing antennas 420-c and 420-d. If Wi-Fi modem 410-a is in the "on/connected" state, LTE modem 405-a may cede control of both antennas to Wi-Fi modem 410-a and declare a RLF to base station 105-c.

At step 515, LTE modem 405-a may send the generated scanning parameters to Wi-Fi modem 410-a based on determining that Wi-Fi modem 410-a is in an "on/not connected" state. The scanning parameter may include a duty cycle that indicates a scanning period 532-a, during which Wi-Fi modem 410-a gains access to one or more of antennas 420, and a communicating period, during which the LTE modem 405-a regains control of antennas 420. For instance, the scanning period 532-a may last 2 seconds, the communicating period may last 8 seconds, and the duty cycle may repeat with a periodicity of 10 seconds. Such a tune away period may be considered a "long tune away" period. Alternatively, the scanning period 532-a may consist of multiple short tune away periods that occur at a shorter intervals, in what may be referred to as "multiple short tune away" periods. Multiple short tune away periods may enable UE 115-d to perform quick scans over the shared band without declaring a RLF to base station 405-a. Wi-Fi modem 410-a may receive the scanning parameter and determine a scanning schedule for future Wi-Fi scans. The scanning parameters may also include an indicator as to how antennas 420-*c* and 420-*d* will be reconfigured (e.g., full tune away, diversity tune away, which antenna will be controlled by which modem, etc.). In some cases, the scanning parameters includes a start time for a WLAN scan and a duration for the WLAN scan.

At step 520, scanning period 532-*a* begins, and antennas 420-*c* and 420-*d* are reconfigured between LTE modem 405-*a* and Wi-Fi modem 410-*a*. In one example, LTE modem 405-*a* cedes access to antenna 420-*d* to Wi-Fi modem 410-*a* but retains control of antenna 420-*c*, in what may be referred to as a "diversity tune away" mode. In this way, LTE modem 405-*a* may retain a connection with base station 105-*c* through antenna 420-*c*, while Wi-Fi modem 410-*a* can concurrently scan the shared band. In some cases, antenna 420-*c* is the primary antenna for the LTE modem while in other cases, it is the secondary antenna. In cases where LTE modem 405-*a* cedes control of both antennas, LTE modem 405-*a* may additionally declare a RLF to base station 105-*c* to halt LTE communications over the shared band.

At step 525, Wi-Fi modem 410-*a* may perform a Wi-Fi scan via antenna 420-*d* over the shared band based on the received scanning parameters. Wi-Fi modem 410-*a* may scan multiple channels in the shared band during scanning period 532-*a* for an available AP. If no available APs are identified, or if a connection attempt is unsuccessful, then Wi-Fi modem 410-*a* returns control of antenna 420-*d* to LTE modem 405-*a* at the end of scanning period 532-*a*. In some cases, the Wi-Fi scan is an active scan during which the Wi-Fi modem send a probe request and waits for a probe response from an AP, such as AP 150-*c*. In other cases, the Wi-Fi scan is a passive scan during which the Wi-Fi modem listens for a signal or beacon from an AP, such as AP 150-*c*.

At step 530, scanning period 532-*a* ends, and antennas 420-*c* and 420-*d* are reconfigured so that LTE modem 405-*a* has control of both antennas. In some cases, Wi-Fi modem 410-*a* completes the Wi-Fi scan prior to the end of scanning period 532-*a* and the antennas are reconfigured at the completion of the Wi-Fi scan. The modems may continue to share the antennas and perform Wi-Fi scans according to the schedule dictated by the scanning parameters.

At step 535, LTE modem 405-*a* may update the scanning parameters based on previous Wi-Fi scanning behavior. For instance, LTE modem 405-*a* may determine that Wi-Fi modem 410 does not scan for the full scanning period 532-*a*. Accordingly, LTE modem 405-*a* may update the scanning parameters to reflect a shorter scanning period. LTE modem 405-*a* may also increase the periodicity of the scanning period. In some cases, LTE modem 405-*a* determines a minimum/maximum scanning period and periodicity. In some cases, the scanning parameters may include an indicator that both antennas 420-*c* and 420-*d* will be controlled by Wi-Fi modem 410-*a*. Updating the scanning parameters may enable the LTE modem 405-*a* to provide an adaptive duty cycle approach that can change based at least in part on previous and expected Wi-Fi channel characteristics.

At step 540, LTE modem 405-*a* may send the updated scan parameters to Wi-Fi modem 410-*a*. The scanning parameters may include an updated scanning period and an indication that both antennas 420 will be ceded to Wi-Fi modem 410-*a*, in what may be referred to as a "full tune away" mode.

At step 545, LTE modem 405-*a* may declare a RLF to base station 105-*c* to prevent further communications from base station 105-*c* to UE 115-*d* based on relinquishing access to both antennas. This may prevent interference with the forthcoming Wi-Fi scan. Declaring a RLF may include sending false parameters, such as low SINR measurements, that are indicative of RLF to base station 105-*c*.

At step 550, scanning period 532-*b* begins, and antennas 420-*c* and 420-*d* may be reconfigured between LTE modem 405-*a* and Wi-Fi modem 410-*a*. In one example, Wi-Fi modem 410-*a* may take control of both antennas 420-*c* and 420-*d*.

At step 555, Wi-Fi modem 410-*a* may then perform a Wi-Fi scan over the shared band. The shared band may include multiple channels, and the Wi-Fi modem 410-*a* may scan one or more channels of the band during the Wi-Fi scan. In some cases, Wi-Fi modem 410-*a* identifies and connects to AP 150-*c* within scanning period 532-*b*. Connecting to AP 150-*c* may include associating with and establishing a communication link with AP 150-*c*. In some cases, Wi-Fi modem 410-*a* may identify AP 150-*c* near the end of a scanning period and the process of associating with and connecting with AP 150-*c* is interrupted. In this case, Wi-Fi modem 410-*a* may resume the connection procedure in a following scanning period. For instance, Wi-Fi modem 410-*a* may resume connecting with AP 150-*c* for the latest connection set-up step. In other cases, Wi-Fi modem 410-*a* may adapt the scanning sequence to scan the channel associated with AP 150-*c* prior to other channels in the shared band and connect with AP 150-*c*.

At step 560, Wi-Fi modem 410-*a* retains control over both antennas 420 based on identifying and connecting to AP 150-*c*. LTE modem 405-*b* does not attempt to regain access to the antennas 420 and UE 115-*d* begins communications with AP 150-*c*. If Wi-Fi modem 410-*a* identifies AP 150-*c* during a diversity tune away procedure, Wi-Fi modem 410-*a* similarly couples to both antennas 420.

Figure 5B:
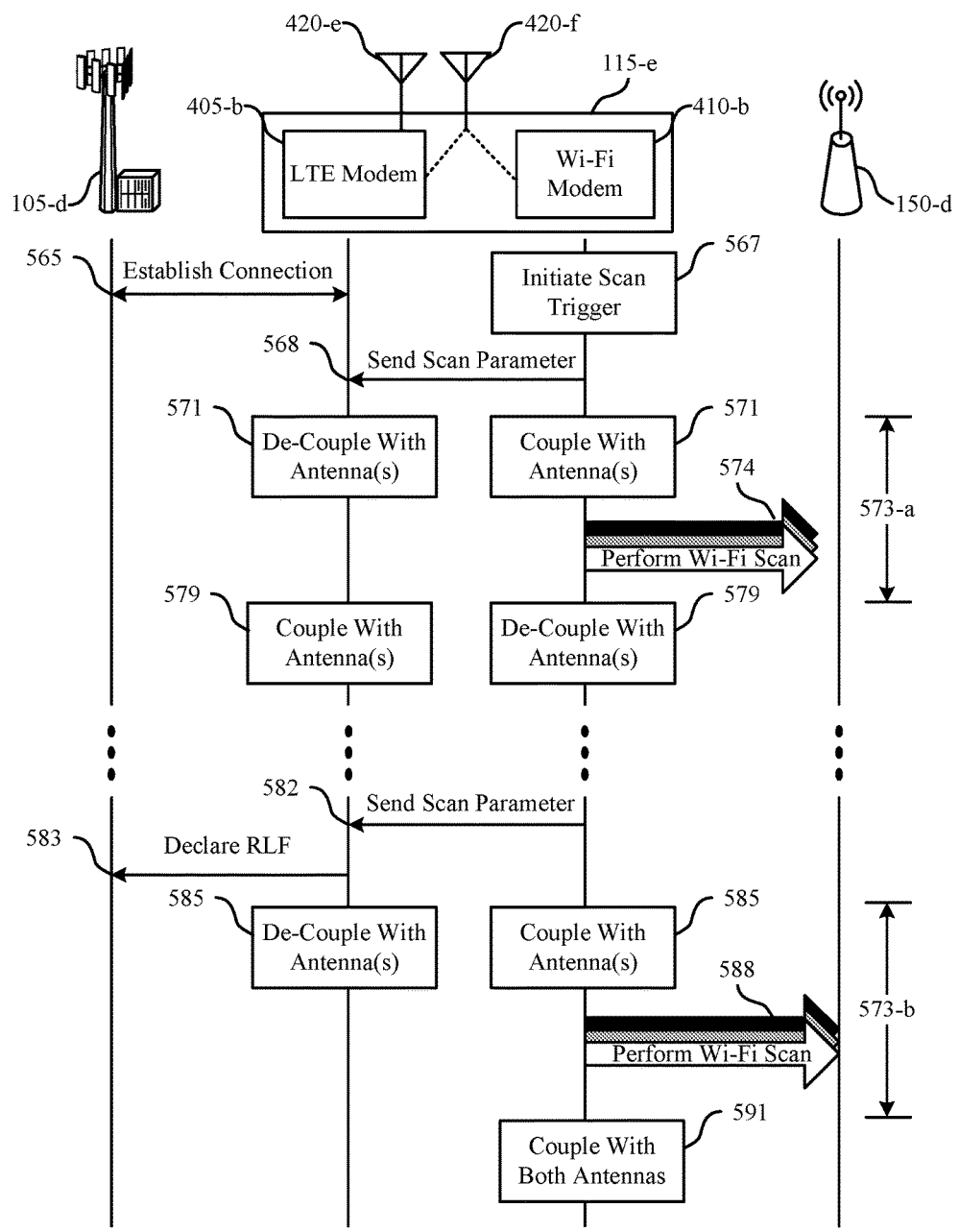

FIG. 5B illustrates an example of a process flow 500-*b* for managing antenna sharing between coexisting RATs in a multimode device in accordance with various aspects of the present disclosure. Process flow 500-*b* may be performed by UE 115-*e*, base station 105-*d*, and AP 150-*d* which may be examples of a UE 115, a base station 105, and an AP 150 as described above with reference to FIGS. 1-2. LTE modem 405-*b* and Wi-Fi modem 410-*b* may modify the configuration of antennas 420-*c* and 420-*d* at UE 115-*d*. In some examples, Wi-Fi modem 410-*b* dictates the schedule for sharing the antennas 420 with LTE modem 405-*b*, in what may be referred to as Wi-Fi directed antenna sharing.

At step 565, UE 115-*e* and base station 105-*d* may establish a connection as described with reference to FIG. 5A. As above, Wi-Fi modem 410-*b* may operate in the "off", "on/not connected", and "on/connected state." In the "off" state Wi-Fi modem 410-*b* may perform app-initiated scans (e.g., location) over the 2.4 GHz band without reconfiguring the antennas 420. In some cases while in the "off state," Wi-Fi modem may gain access to one or more of antennas 420 to perform app-initiated scan over either the 2.4 GHz band or the 5 GHz band. In the "on/not connected" state Wi-Fi modem 410-*b* may gain access to one or more of antennas 420 to perform Wi-Fi scanning and/or app-initiated scanning. In the "on/connected" state Wi-Fi modem 410-*b* may have full access to antennas 420-*e* and 420-*f* and LTE modem 405-*b* may declare a RLF to base station 105-*d*.

At step 567, a scanning trigger is initiated at Wi-Fi modem 410-*b* or at an application at UE 115-*e*. After the scanning trigger has been initiated Wi-Fi modem 410-*b* may determine scanning parameters for the forthcoming Wi-Fi scan.

At step 568, Wi-Fi modem 410-*b* may send the determined scanning parameters to LTE modem 405-*b*. The scanning parameters may include an indication of a start time and a duration of the Wi-Fi scan associated with a scanning period. The scanning parameters may also include information indicating the antenna configuration, full tune away or diversity tune away operation, etc. In some cases, the scanning parameter only includes a start time and LTE modem 405-*b* determines when the Wi-Fi scan has ended.

At step 571, scanning period 573-*a* begins, and the antennas 420-*e* and 420-*f* are reconfigured between LTE modem 405-*b* and the Wi-Fi modem 410-*b*. In one example, Wi-Fi modem 410-*b* takes control of antenna 420-*f*, while LTE modem 405-*b* retains control of antenna 420-*e*, in what may be referred to as "diversity tune away" mode. In this way, LTE modem 405-*b* may retain a connection with base station 105-*d* through antenna 420-*e*, while Wi-Fi modem 410-*b* can concurrently scan the shared band. In some cases, antenna 420-*e* is the primary antenna for the LTE modem 405-*b* while in other cases, it is the secondary antenna. In cases where Wi-Fi modem 410-*a* takes control of both antennas (e.g., "full tune away" mode, LTE modem 405-*a* may additionally declare a RLF to base station 105-*d* to halt LTE communications over the shared band.

At step 574, Wi-Fi modem 410-*b* may perform a Wi-Fi scan via antenna 420-*f* over the shared band based on the determined scanning parameters. Wi-Fi modem 410-*b* may scan multiple channels in the shared band during scanning period 573-*a* for an available AP. If no available APs are identified then Wi-Fi modem 410-*b* returns control of antenna 420-*f* to LTE modem 405-*b* at the end of scanning period 573-*a*.

At step 579, scanning period 573-*a* ends, and antennas 420-*e* and 420-*f* are reconfigured so that LTE modem 405-*b* has control of both antennas. The modems may continue to share the antennas and perform Wi-Fi scans at intervals and for scanning periods determined by Wi-Fi modem 410-*b*.

At step 582, Wi-Fi modem 410-*b* may send another set of scanning parameters to LTE modem 405-*b*. This set of scanning parameters may indicate to LTE modem 405-*b* that Wi-Fi modem 410-*b* will scan the shared spectrum with both antennas 420 along with a start time and a scanning duration.

At step 583, LTE modem 405-*b* declares a RLF to base station 105-*d* prior to the scanning period 573-*b*. This may prevent further communications between base station 105-*d* and UE 115-*e* that may interfere with the forthcoming Wi-Fi scan.

At step 585, scanning period 573-*b* begins, and Wi-Fi modem 410-*b* takes control of both antenna 420-*e* and antenna 420-*f*.

At step 588, Wi-Fi modem 410-*b* performs a Wi-Fi scan over the shared band using both antennas. Wi-Fi modem 410-*b* identifies AP 150-*d* as an available AP and begins association and/or connection procedures. In some cases, Wi-Fi modem 410-*b* may identify AP 150-*d* near the end of a scanning period and the process of associating with and connecting with AP 150-*d* is interrupted. In this case, Wi-Fi modem 410-*b* may resume the connection procedure in a following scanning period.

At step 591, Wi-Fi modem 410-*b* retains control over both antennas 420 based on identifying and connecting to AP 150-*c*. LTE modem 405-*b* does not attempt to regain access to the antennas 420 and UE 115-*e* begins communications with AP 150-*d*. If Wi-Fi modem 410-*a* identifies AP 150-*c* during a diversity tune away procedure, Wi-Fi modem 410-*a* similarly couples to both antennas 420.

Features from either FIG. 5A or 5B may be combined, omitted, or performed in a different order. For instance, a UE 115 may utilize aspects of LTE directed sharing and Wi-Fi directed sharing based on a scanning trigger. A UE 115 may additionally use different combinations of full tune away and diversity tune away procedure. In one example, a UE 115 may use LTE directed sharing for station initiated scanning (e.g., scanning a Wi-Fi modem in the "on/not connected" state) and limit app initiated location scanning to the 2.4 GHz band. The UE 115 may additionally utilize diversity tune away and long tune away periods to decrease overhead and maintain a connection with a base station.

In another example, app initiated scanning may be Wi-Fi directed, while station initiated scanning may be LTE-U directed. In another example, station initiated scanning is Wi-Fi directed while app initiated location scanning is limited to the 2.4 GHz band. In yet another example, for station initiated scanning the LTE modem determines the start of the tune away period and the Wi-Fi modem determines the end of the tune away period, while app initiated location scanning is limited to the 2.4 GHz band. In still another example, scanning may be Wi-Fi directed, but the LTE modem may reject a request from the Wi-Fi modem for tune away. In yet another example, the beginning of the tune away period is determined by the Wi-Fi modem, and the length of the tune away period is determined by the LTE modem. Any of these hybrid approaches may utilize any combination of full tune away, diversity tune away, long tune away, and multiple short tune away mode. Additionally, any of these approaches may be utilized with either a cross antenna or a share primary antenna configuration.

Figure 6:
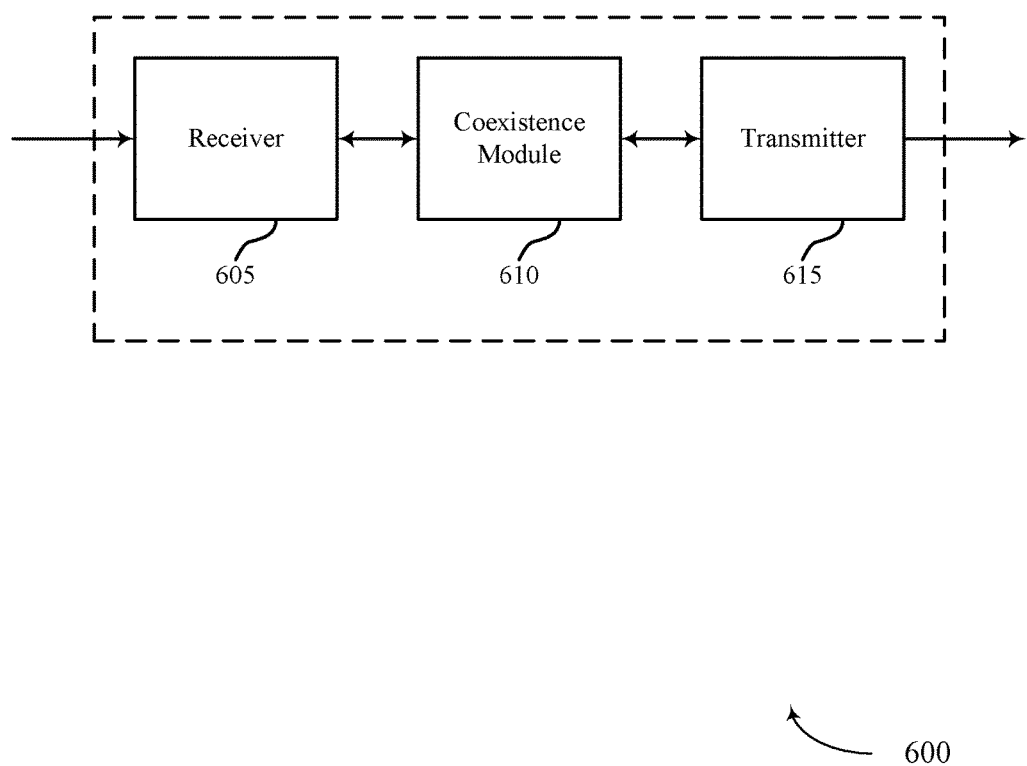
FIGS. 6-8 show block diagrams of a wireless device that supports coexistence over a shared band with dual antenna sharing in accordance with various aspects of the present disclosure.

FIG. 6 shows a block diagram of a wireless device 600 configured for coexistence over a shared band with dual antenna sharing in accordance with various aspects of the present disclosure. Wireless device 600 may be an example of aspects of a UE 115 described with reference to FIGS. 1-5B. Wireless device 600 may include a receiver 605, a coexistence module 610, or a transmitter 615. Wireless device 600 may also include a processor. Each of these components may be in communication with each other.

The receiver 605 may receive information such as packets, user data, or control information associated with various information channels (e.g., control channels, data channels, and information related to coexistence over a shared band with dual antenna sharing, etc.). Information may be passed on to the coexistence module 610, and to other components of wireless device 600.

The coexistence module 610 may receive a WLAN scanning parameter at a first modem of the wireless device from a second modem of the wireless device, wherein the first modem is associated with a first RAT and the second modem is associated with a second RAT, modify a distribution of the plurality of antennas between the first modem and the second modem based at least in part on the WLAN scanning parameter, and perform a WLAN scan on channels in a band that is shared by the first modem and the second modem based at least in part on the distribution of the plurality of antennas.

The transmitter 615 may transmit signals received from other components of wireless device 600. In some examples, the transmitter 615 may be collocated with the receiver 605 in a transceiver module. The transmitter 615 may include a single antenna, or it may include a plurality of antennas.

Figure 7:
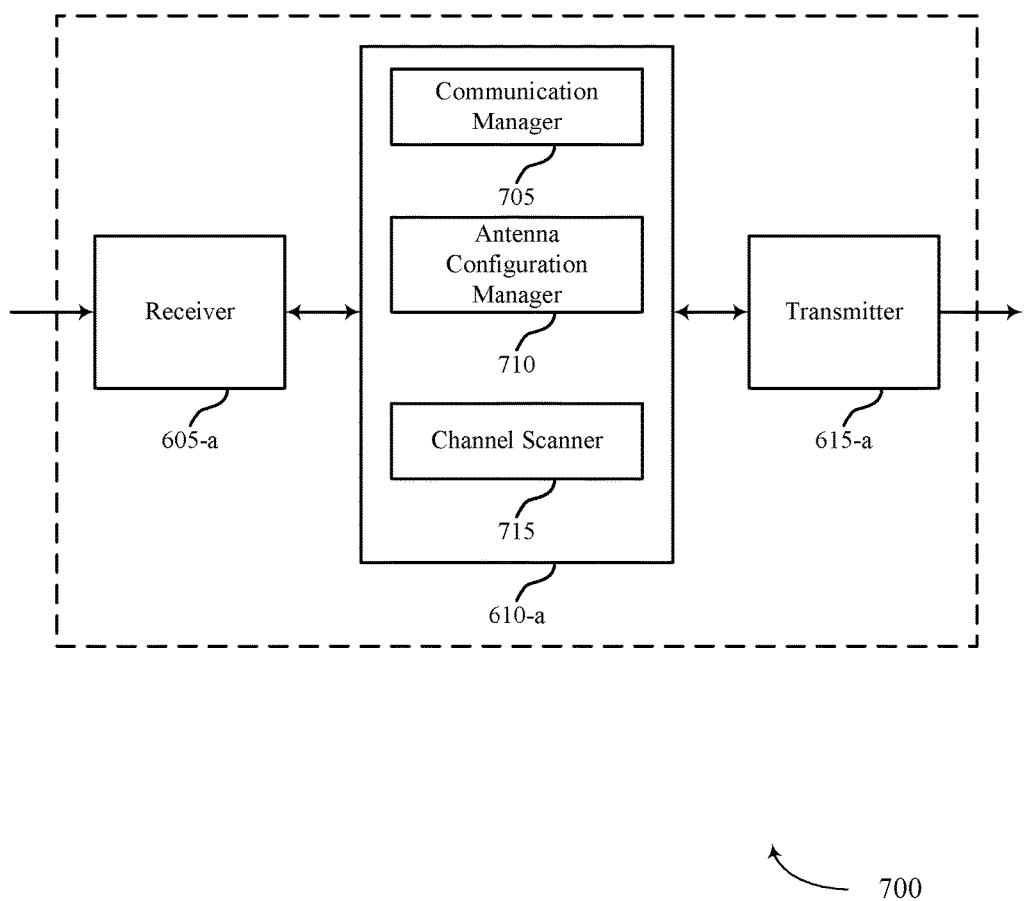

FIG. 7 shows a block diagram of a wireless device 700 for coexistence over a shared band with dual antenna sharing in accordance with various aspects of the present disclosure. Wireless device 700 may be an example of aspects of a wireless device 600 or a UE 115 described with reference to FIGS. 1-6. Wireless device 700 may include a receiver 605-*a*, a coexistence module 610-*a*, or a transmitter 615-*a*.

Wireless device 700 may also include a processor. Each of these components may be in communication with each other. The coexistence module 610-*a* may also include a communication manager 705, an antenna configuration manager 710, and a channel scanner 715.

The receiver 605-*a* may receive information which may be passed on to coexistence module 610-*a*, and to other components of wireless device 700. The coexistence module 610-*a* may perform the operations described with reference to FIG. 6. The transmitter 615-*a* may transmit signals received from other components of wireless device 700.

The communication manager 705 may receive a WLAN scanning parameter at a first modem of the wireless device from a second modem of the wireless device, wherein the first modem is associated with a first RAT and the second modem is associated with a second RAT as described with reference to FIGS. 2-5B. In some examples, the first modem comprises a WLAN modem and the second modem comprises a cellular modem, and wherein the WLAN scan may be performed by the WLAN modem. The communication manager 705 may also transmit, by the cellular modem, the WLAN scanning parameter to the WLAN modem based at least in part on the state of the WLAN modem. In some examples, the first modem comprises a cellular modem and the second modem comprises a WLAN modem. The communication manager 705 may also detect a WLAN scanning trigger. The communication manager 705 may also receive a WLAN scanning parameter at the WLAN modem from the cellular modem.

The antenna configuration manager 710 may modify a distribution of the plurality of antennas between the first modem and the second modem based at least in part on the WLAN scanning parameter as described with reference to FIGS. 2-5B. In some examples, modifying the distribution of the plurality of antennas between the first modem and the second modem comprises performing a diversity antenna tune-away for the WLAN scan. In some examples, modifying the distribution of the plurality of antennas between the first modem and the second modem comprises coupling a subset of the plurality of antennas to the WLAN modem during the first period and to the cellular modem during the second period. In some examples, modifying the distribution of the plurality of antennas comprises decoupling the subset of the plurality of antennas from the cellular modem during the first period. In some examples, modifying the distribution of the plurality of antennas comprises decoupling the subset of the plurality of antennas from the WLAN modem during the second period. In some examples, modifying the distribution of the plurality of antennas comprises coupling a subset of the plurality of antennas to the WLAN modem for the indicated duration of the WLAN scan. The antenna configuration manager 710 may also decouple the subset of the plurality of antennas from the cellular modem for the indicated duration of the WLAN scan. The antenna configuration manager 710 may also select a distribution of the plurality of antennas between a cellular modem of the wireless device and a WLAN modem of the wireless device based at least in part on whether the detected WLAN scanning trigger originates from an application of the wireless device or from the WLAN modem of the wireless device. In some examples, selecting the distribution of the plurality of antennas comprises decoupling a subset of the plurality of antennas from the cellular modem and coupling the subset of the plurality of antennas to the WLAN modem if the WLAN scanning trigger originates from the WLAN modem. In some examples, selecting the distribution of the plurality of antennas comprises maintaining a current antenna configuration if the scanning trigger originates from the application of the wireless device.

The channel scanner 715 may perform a WLAN scan on one or more channels over a band that is shared by the first modem and the second modem based at least in part on the distribution of the plurality of antennas as described with reference to FIGS. 2-5B. The channel scanner 715 may also perform the WLAN scan based at least in part on a determination by the WLAN modem that a duration of the WLAN scan is shorter than the first period. In some examples, the WLAN scan may be performed by the WLAN modem. The channel scanner 715 may also perform a WLAN scan on channels within a shared band using the WLAN modem of the wireless device. The channel scanner 715 may also select a band for the WLAN scan based at least in part on whether the detected WLAN scanning trigger originates from the application of the wireless device or from the WLAN modem of the wireless device. In some examples, the WLAN scan may be performed using the subset of the plurality of antennas. In some examples, the WLAN scan may be performed using the WLAN scanning parameter from the cellular modem based at least in part on the WLAN scanning trigger originating from the WLAN modem.

Figure 8:
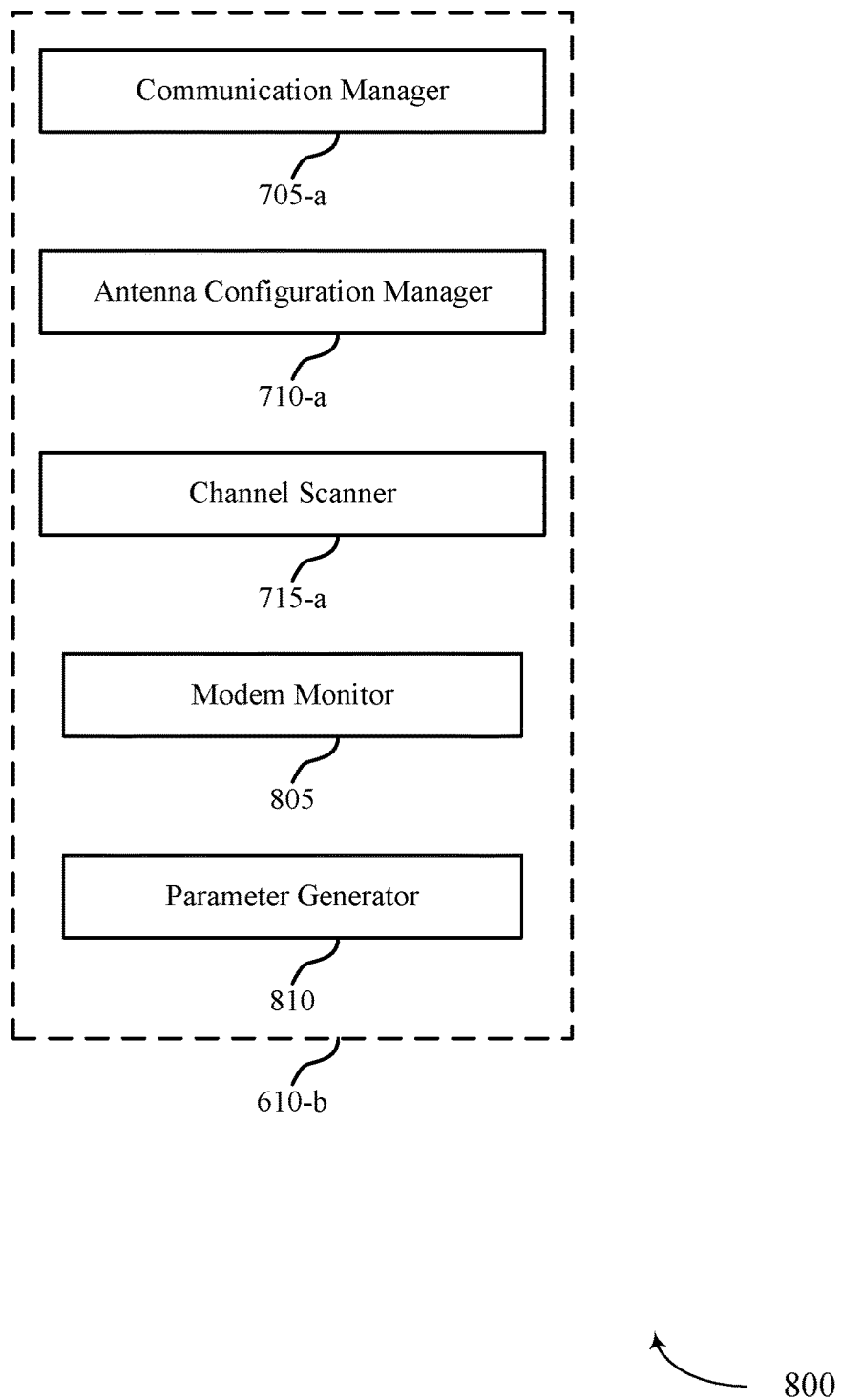

FIG. 8 shows a block diagram 800 of a coexistence module 610-*b* which may be a component of a wireless device 600 or a wireless device 700 for coexistence over a shared band with dual antenna sharing in accordance with various aspects of the present disclosure. The coexistence module 610-*b* may be an example of aspects of a coexistence module 610 described with reference to FIGS. 6-7. The coexistence module 610-*b* may include a communication manager 705-*a*, an antenna configuration manager 710-*a*, and a channel scanner 715-*a*. Each of these modules may perform the functions described with reference to FIG. 7. The coexistence module 610-*b* may also include a modem monitor 805, and a parameter generator 810.

The modem monitor 805 may determine a state of the WLAN modem at the cellular modem as described with reference to FIGS. 2-5B.

The parameter generator 810 may be configured such that the WLAN scanning parameter may include an indication of a start time and a duration of the WLAN scan as described with reference to FIGS. 2-5B. In some examples, the WLAN scanning parameter comprises a duty cycle associated with the WLAN scan and the modified distribution of the plurality of antennas. The parameter generator 810 may also determine the duty cycle at the cellular modem based at least in part on a previous WLAN scan by the WLAN modem. In some examples, the duty cycle indicates a first period and a second period. In some examples, the WLAN scanning parameter comprises an indication of a start time and a duration of the WLAN scan.

Figure 9:
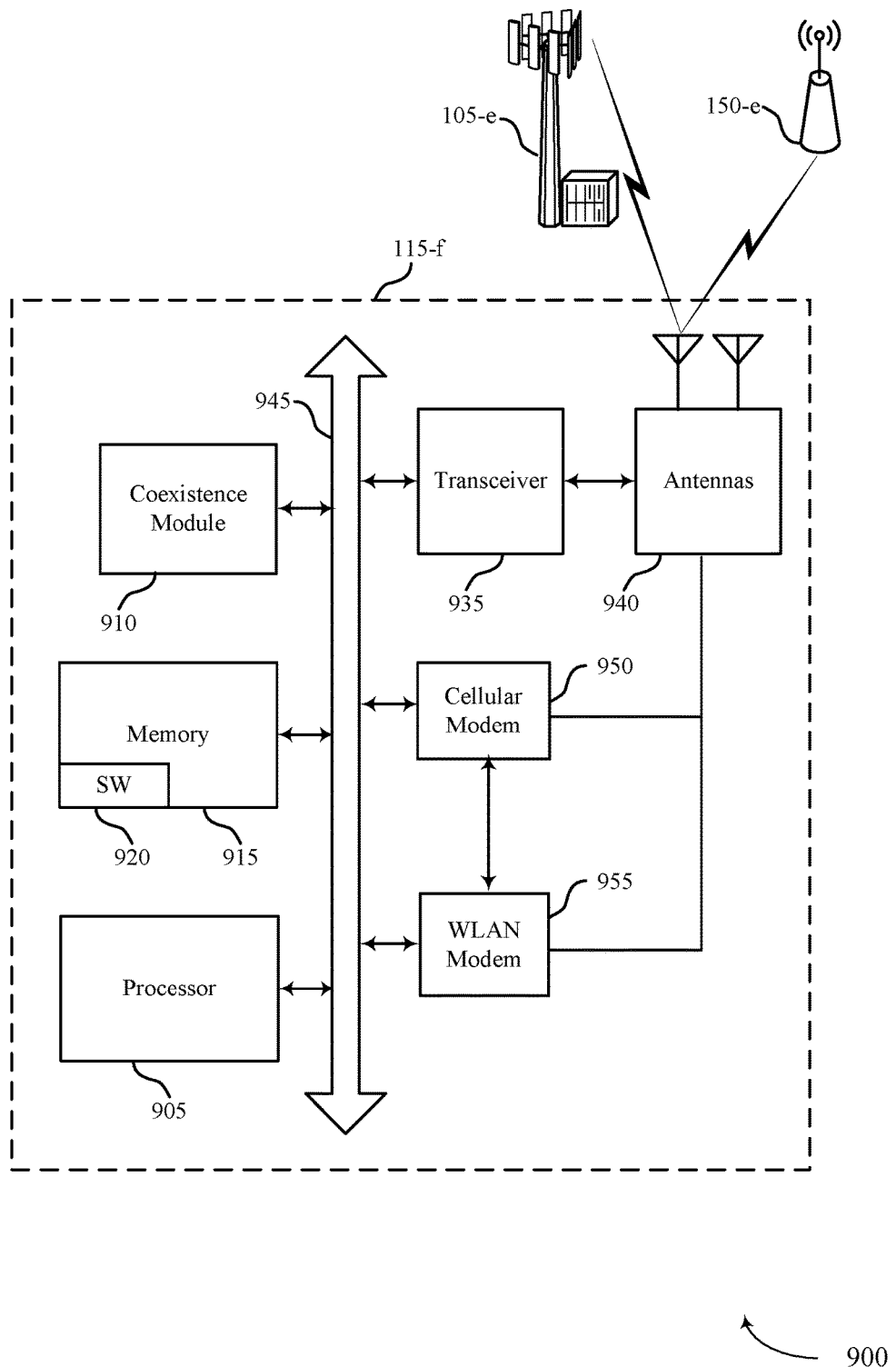
FIG. 9 illustrates a block diagram of a system including a UE that supports coexistence over a shared band with dual antenna sharing in accordance with various aspects of the present disclosure.

FIG. 9 shows a diagram of a system 900 including a UE 115 configured for coexistence over a shared band with dual antenna sharing in accordance with various aspects of the present disclosure. System 900 may include UE 115-*f*, which may be an example of a wireless device 600, a wireless device 700, or a UE 115 described with reference to FIGS. 1, 2 and 6-8. UE 115-*f* may include a coexistence module 910, which may be an example of a coexistence module 610 described with reference to FIGS. 6-8. UE 115-*f* may also include components for bi-directional voice and data communications including components for transmitting communications and components for receiving communications. For example, UE 115-*f* may communicate bi-directionally with base station 105-*e* or AP 150-*e*.

UE 115-*f* may also include a processor 905, and memory 915 (including software (SW)) 920, a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*f* may include a single antenna 940, UE 115-*f* may also have multiple antennas 940 capable of concurrently transmitting or receiving multiple wireless transmissions.

UE 115-*f* may also include a cellular modem 950 and a WLAN modem 955. Each modem may be coupled with aspects of the coexistence module 910. In some cases, aspects of the coexistence module 910 may be incorporated into the cellular modem 950 and the WLAN modem 955 itself. The cellular modem 950 and the WLAN modem 955 may configure the antennas 940 as described above with reference to FIGS. 1-5B.

The memory 915 may include random access memory (RAM) and read only memory (ROM). The memory 915 may store computer-readable, computer-executable software/firmware code 920 including instructions that, when executed, cause the processor 905 to perform various functions described herein (e.g., coexistence over a shared band with dual antenna sharing, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an application specific integrated circuit (ASIC), etc.)

The components of wireless device 600, wireless device 700, and coexistence module 610-*b* may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
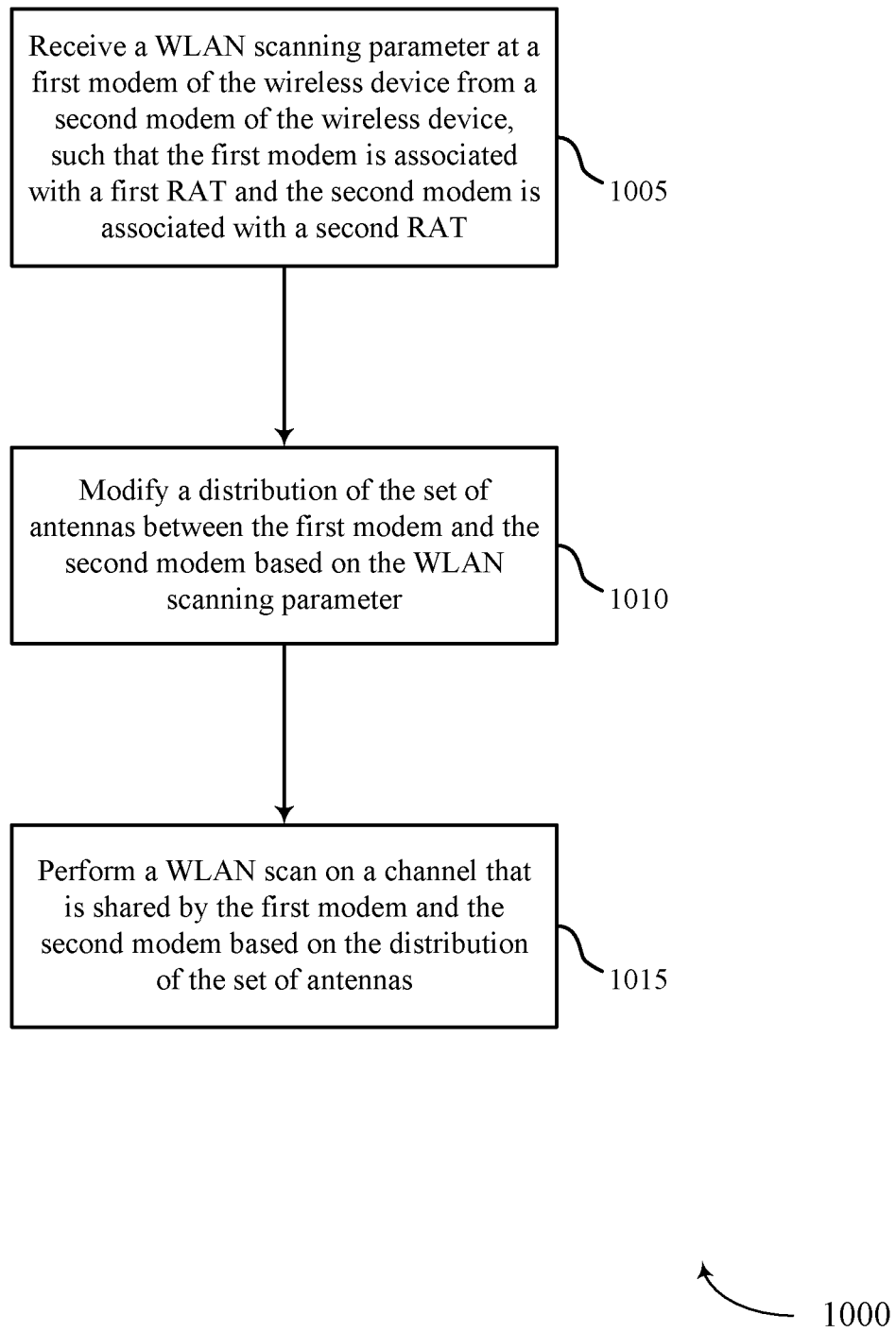
FIGS. 10-11 illustrate methods for coexistence over a shared band with dual antenna sharing in accordance with various aspects of the present disclosure.

FIG. 10 shows a flowchart illustrating a method 1000 for coexistence over a shared band with dual antenna sharing in accordance with various aspects of the present disclosure. The operations of method 1000 may be implemented by a UE 115 or its components as described with reference to FIGS. 1-9. For example, the operations of method 1000 may be performed by the coexistence module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1005, the UE 115 may receive a WLAN scanning parameter at a first modem of the wireless device from a second modem of the wireless device, wherein the first modem is associated with a first RAT and the second modem is associated with a second RAT as described with reference to FIGS. 2-5B. In certain examples, the operations of block 1005 may be performed by the communication manager 705 as described with reference to FIG. 7.

At block 1010, the UE 115 may modify a distribution of the plurality of antennas between the first modem and the second modem based at least in part on the WLAN scanning parameter as described with reference to FIGS. 2-5B. In certain examples, the operations of block 1010 may be performed by the antenna configuration manager 710 as described with reference to FIG. 7.

At block 1015, the UE 115 may perform a WLAN scan on channels in a band that is shared by the first modem and the second modem based at least in part on the distribution of the plurality of antennas as described with reference to FIGS. 2-5B. In certain examples, the operations of block 1015 may be performed by the channel scanner 715 as described with reference to FIG. 7.

Figure 11:
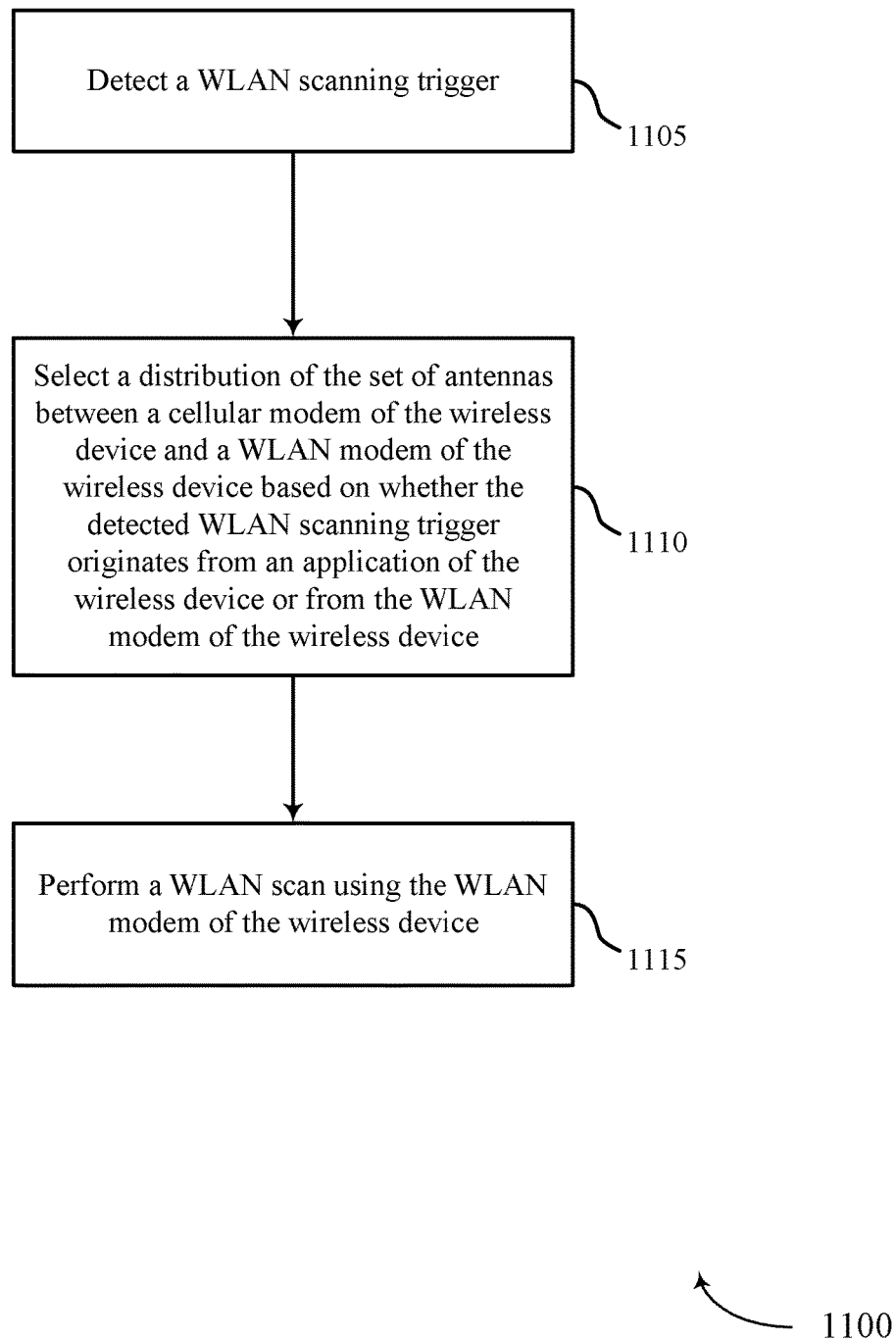

FIG. 11 shows a flowchart illustrating a method 1100 for coexistence over a shared band with dual antenna sharing in accordance with various aspects of the present disclosure. The operations of method 1100 may be implemented by a UE 115 or its components as described with reference to FIGS. 1-9. For example, the operations of method 1100 may be performed by the coexistence module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1100 may also incorporate aspects of methods 1000 of FIG. 10.

At block 1105, the UE 115 may detect a WLAN scanning trigger as described with reference to FIGS. 2-5B. In certain examples, the operations of block 1105 may be performed by the communication manager 705 as described with reference to FIG. 7.

At block 1110, the UE 115 may select a distribution of the plurality of antennas between a cellular modem of the wireless device and a WLAN modem of the wireless device based at least in part on whether the detected WLAN scanning trigger originates from an application of the wireless device or from the WLAN modem of the wireless device as described with reference to FIGS. 2-5B. In certain examples, the operations of block 1110 may be performed by the antenna configuration manager 710 as described with reference to FIG. 7.

At block 1115, the UE 115 may perform a WLAN scan on channels within a shared band using the WLAN modem of the wireless device as described with reference to FIGS. 2-5B. In certain examples, the operations of block 1115 may be performed by the channel scanner 715 as described with reference to FIG. 7.

Thus, methods 1000 and 1100 may provide for coexistence over a shared band with dual antenna sharing. It should be noted that methods 1000 and 1100 describe possible implementations, and that the operations and the steps may be rearranged or otherwise modified such that other implementations are possible. In some examples, aspects from two or more of the methods 1000 and 1100 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and Long Term Evolution (LTE)-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a wireless device comprising a plurality of antennas, comprising:
    receiving a wireless local area network (WLAN) scanning parameter at a WLAN modem of the wireless device from a cellular modem of the wireless device, wherein the WLAN modem is associated with a WLAN network and the cellular modem is associated with a cellular network;
    modifying a distribution of the plurality of antennas between the WLAN modem and the cellular modem based at least in part on the WLAN scanning parameter, wherein the WLAN scanning parameter comprises a duty cycle associated with a previous WLAN scan by the WLAN modem; and
    performing, by the WLAN modem, a WLAN scan on channels in a band that is shared by the WLAN modem and the cellular modem based at least in part on the distribution of the plurality of antennas.

2. The method of claim 1, wherein modifying the distribution of the plurality of antennas between the WLAN modem and the cellular modem comprises:
    performing a diversity antenna tune-away for the WLAN scan.

3. The method of claim 1, further comprising:
    determining a state of the WLAN modem at the cellular modem; and
    transmitting, by the cellular modem, the WLAN scanning parameter to the WLAN modem based at least in part on the state of the WLAN modem.

4. The method of claim 1, wherein the WLAN scanning parameter comprises an indication of a start time and a duration of the WLAN scan.

5. The method of claim 1, further comprising:
    determining the duty cycle at the cellular modem based at least in part on the previous WLAN scan by the WLAN modem.

6. The method of claim 1, wherein the duty cycle indicates a first period and a second period, and wherein modifying the distribution of the plurality of antennas between the first modem and the second modem comprises:
coupling a subset of the plurality of antennas to the WLAN modem during the first period and to the cellular modem during the second period.

7. The method of claim 6, wherein performing the WLAN scan is based at least in part on a determination by the WLAN modem that a duration of the WLAN scan is shorter than the first period.

8. The method of claim 6, wherein modifying the distribution of the plurality of antennas comprises:
decoupling the subset of the plurality of antennas from the cellular modem during the first period; and
modifying the distribution of the plurality of antennas comprises:
decoupling the subset of the plurality of antennas from the WLAN modem during the second period.

9. An apparatus for wireless communication at a wireless device comprising a plurality of antennas, comprising:
a processor;
memory in electronic communication with the processor; and
instructions stored in the memory and operable, when executed by the processor, to cause the apparatus to:
receive a wireless local area network (WLAN) scanning parameter at a WLAN modem of the wireless device from a cellular modem of the wireless device, wherein the WLAN modem is associated with a WLAN network and the cellular modem is associated with a cellular network;
modify a distribution of the plurality of antennas between the WLAN modem and the cellular modem based at least in part on the WLAN scanning parameter, wherein the WLAN scanning parameter comprises a duty cycle associated with a previous WLAN scan by the WLAN modem; and
perform, by the WLAN modem, a WLAN scan on channels in a band that is shared by the WLAN modem and the cellular modem based at least in part on the distribution of the plurality of antennas.

10. The apparatus of claim 9, wherein modify the distribution of the plurality of antennas between the WLAN modem and the cellular modem comprises:
perform a diversity antenna tune-away for the WLAN scan.

11. The apparatus of claim 9, wherein the instructions are operable to cause the processor to:
determine a state of the WLAN modem at the cellular modem; and
transmit, by the cellular modem, the WLAN scanning parameter to the WLAN modem based at least in part on the state of the WLAN modem.

12. The apparatus of claim 9, wherein the WLAN scanning parameter further comprises an indication of a start time and a duration of the WLAN scan.

* * * * *